United States Patent
Deen et al.

(10) Patent No.: US 9,685,178 B1
(45) Date of Patent: Jun. 20, 2017

(54) LATERAL SPIN VALVE READER WITH LARGE-AREA TUNNELING SPIN-INJECTOR

(71) Applicant: Seagate Technology LLC, Cupertino, CA (US)

(72) Inventors: David A. Deen, Edina, MN (US); Taras G. Pokhil, Arden Hills, MN (US); Eric Singleton, Maple Plain, MN (US); Mohammed Shariat Ullah Patwari, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/183,347

(22) Filed: Jun. 15, 2016

Related U.S. Application Data

(60) Provisional application No. 62/175,540, filed on Jun. 15, 2015.

(51) Int. Cl.
*G11B 5/39* (2006.01)

(52) U.S. Cl.
CPC .............. *G11B 5/398* (2013.01); *G11B 5/397* (2013.01); *G11B 5/3909* (2013.01); *G11B 5/3912* (2013.01); *G11B 5/3948* (2013.01); *G11B 2005/3996* (2013.01)

(58) Field of Classification Search
None
See application file for complete search history.

(56) References Cited

U.S. PATENT DOCUMENTS

| | | | |
|---|---|---|---|
| 7,020,013 B2 | 3/2006 | Johnson |
| 7,193,891 B2 | 3/2007 | Johnson |
| 7,209,328 B2 | 4/2007 | Ito et al. |
| 7,280,322 B2 | 10/2007 | Takahashi et al. |
| 7,298,597 B2 | 11/2007 | Carey et al. |
| 7,522,392 B2 | 4/2009 | Carey et al. |
| 8,072,713 B2 | 12/2011 | Yamada et al. |
| 8,717,715 B1 | 5/2014 | Sato et al. |
| 9,042,061 B2 | 5/2015 | Dimitrov et al. |
| 9,064,509 B2 | 6/2015 | Dimitrov et al. |
| 2006/0022220 A1 | 2/2006 | Inomata et al. |
| 2007/0253116 A1 | 11/2007 | Takahashi |
| 2007/0253121 A1 | 11/2007 | Yamada et al. |
| 2009/0154030 A1 | 6/2009 | Yamada et al. |
| 2010/0119875 A1 | 5/2010 | Sasaki |
| 2010/0296202 A1 | 11/2010 | Boone, Jr. et al. |
| 2011/0042648 A1 | 2/2011 | Koo et al. |
| 2015/0029609 A1 | 1/2015 | Kamiguchi et al. |

(Continued)

*Primary Examiner* — Craig A. Renner
(74) *Attorney, Agent, or Firm* — Westman, Champlin & Koehler, P.A.

(57) ABSTRACT

A lateral spin valve reader includes a channel layer having a first end that is proximate to a bearing surface and a second end that is away from the bearing surface. The lateral spin valve reader also includes a detector structure disposed over an upper surface of a first portion of the channel layer that is proximate to the first end of the channel layer. A spin injection structure disposed below a lower surface of a second portion of the channel layer is proximate to the second end of the channel layer. An area of overlap between the spin injection structure and the second portion of the channel layer is substantially larger than an area of overlap between the detector structure and the first portion of the channel layer.

20 Claims, 10 Drawing Sheets

(56) References Cited

U.S. PATENT DOCUMENTS

2015/0035524 A1* 2/2015 Sasaki et al. ........ G01R 33/093
 324/244
2016/0154071 A1* 6/2016 Sasaki .................. G01R 33/093
 360/313

* cited by examiner

LATERAL SPIN VALVE READER WITH LARGE-AREA TUNNELING SPIN-INJECTOR

CROSS-REFERENCE TO RELATED APPLICATIONS

The present application is based on and claims the benefit of U.S. provisional patent application Ser. No. 62/175,540, filed Jun. 15, 2015, the content of which is hereby incorporated by reference in its entirety.

BACKGROUND

Data storage devices commonly have a recording head that includes a read transducer that reads information from a data storage medium and a write transducer that writes information to a data storage medium.

In magnetic data storage devices such as disc drives, a magnetoresistive (MR) sensor such as a Giant Magnetoresistive (GMR) sensor or a Tunnel Junction Magnetoresistive (TMR) sensor has traditionally been employed as the read transducer to read a magnetic signal from the magnetic media. The MR sensor has an electrical resistance that changes in response to an external magnetic field. This change in electrical resistance can be detected by processing circuitry in order to read magnetic data from the adjacent magnetic media.

The ever increasing need for increased data storage necessitates ever increasing data density in magnetic data storage devices. One way to increase data density is to decrease the size and spacing of magnetic bits recorded on the media. The read sensor is generally sandwiched between a pair of magnetic shields, the spacing between which determines the bit length, also referred to as gap thickness. Sensors such as GMR or TMR sensors are constructed as a stack of layers all formed upon one another sandwiched between the magnetic shields. Accordingly, the ability to reduce the spacing between shields with such a sensor structure is limited.

SUMMARY

The present disclosure relates to a lateral spin valve reader that addresses scaling challenges posed by greater data density requirements and includes one or more features that decrease a total reader resistance and increase an amplitude of a bit detection signal. The lateral spin valve reader includes a channel layer having a first end that is proximate to a bearing surface and a second end that is away from the bearing surface. The lateral spin valve reader also includes a detector structure disposed over an upper surface of a first portion of the channel layer that is proximate to the first end of the channel layer. A spin injection structure disposed below a lower surface of a second portion of the channel layer is proximate to the second end of the channel layer. An area of overlap between the spin injection structure and the second portion of the channel layer is substantially larger than an area of overlap between the detector structure and the first portion of the channel layer.

Other features and benefits that characterize embodiments of the disclosure will be apparent upon reading the following detailed description and review of the associated drawings.

DETAILED DESCRIPTION OF ILLUSTRATIVE EMBODIMENTS

Magnetic reader embodiments described below relate to lateral spin valve (LSV) readers that include a spin injector, a detector and a channel layer extending from the spin injector to the detector. The spin injector injects electron spins into the channel layer, which transports the spins to the detector. At the detector, the spins aid in detecting bits stored on a magnetic data storage medium. To decrease a total reader resistance and increase an amplitude of the bit detection signal, different embodiments employ a spin valve reader design that simultaneously increases spin-polarized current and decreases a junction resistance at an injector-channel interface. Prior to providing additional details regarding the different embodiments, a description of an illustrative operating environment is provided below.

Figure 1:
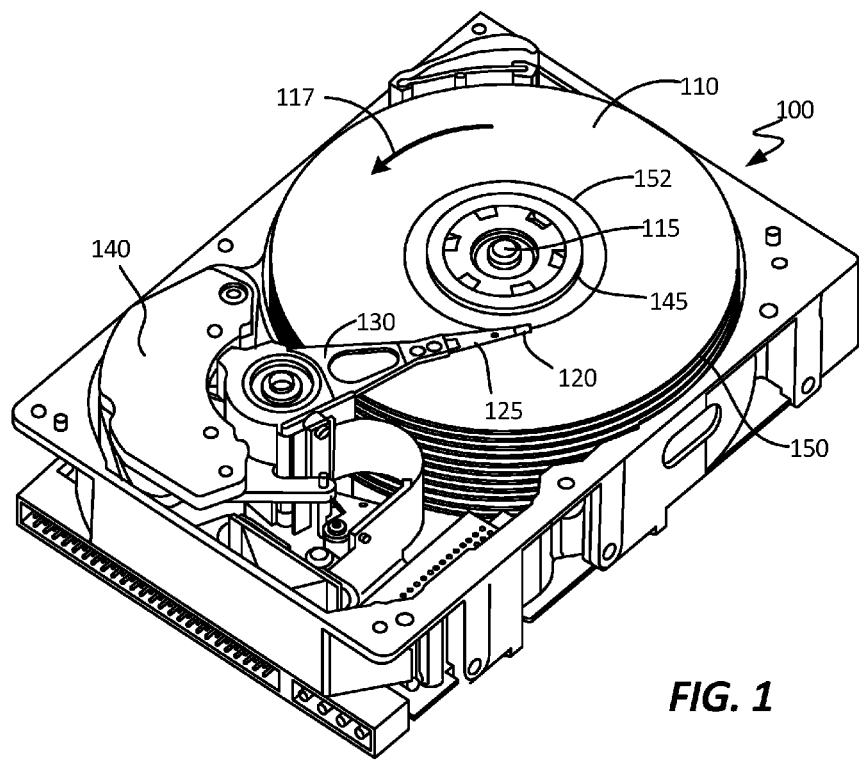
FIG. 1 is a perspective view of a data storage system.
Figure 2:
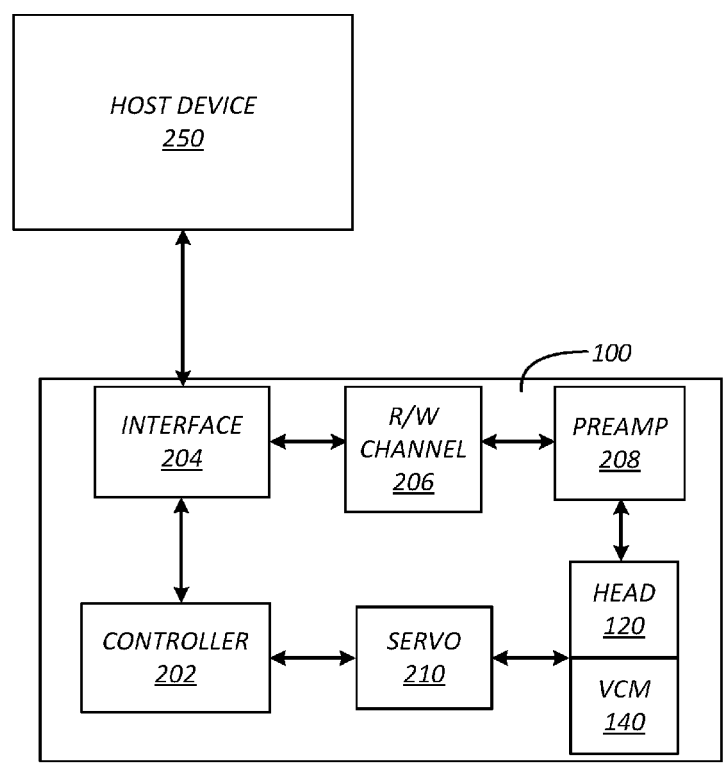
FIG. 2 is a generalized functional block diagram of a data storage system.

FIGS. 1 and 2 together show an illustrative operating environment in which certain specific embodiments disclosed herein may be incorporated. The operating environment shown in FIGS. 1 and 2 is for illustration purposes only. Embodiments of the present disclosure are not limited to any particular operating environment such as the operating environment shown in FIGS. 1 and 2. Embodiments of the present disclosure are illustratively practiced within any number of different types of operating environments.

FIG. 1 is a perspective view of a hard disc drive 100. Hard disc drives are a common type of data storage system. While embodiments of this disclosure are described in terms of disc drives, other types of data storage systems should be considered within the scope of the present disclosure. The same reference numerals are used in different figures for same or similar elements.

Disc drive 100 includes a data storage medium (for example, a magnetic disc) 110. Those skilled in the art will recognize that disc drive 100 can contain a single disc or multiple discs. Medium 110 is mounted on a spindle motor assembly 115 that facilitates rotation of the medium about a central axis. An illustrative direction of rotation is shown by arrow 117. Each disc surface has an associated recording head 120 that carries a read transducer and a write transducer for communication with the surface of the disc. Each head 120 is supported by a head gimbal assembly 125. Each head gimbal assembly (HGA) 125 illustratively includes a suspension and a HGA circuit. Each HGA circuit provides electrical pathways between a recording head and associated hard disc drive electrical components including preamplifiers, controllers, printed circuit boards, or other components.

Each suspension mechanically supports an HGA circuit and a recording head 120, and transfers motion from actuator arm 130 to recording head 120. Each actuator arm 130 is rotated about a shaft by a voice coil motor assembly 140. As voice coil motor assembly 140 rotates actuator arm 130, head 120 moves in an arc between a disc inner diameter 145 and a disc outer diameter 150 and may be positioned over a desired track such as 152 to read and/or write data.

FIG. 2 is a generalized block diagram of illustrative control circuitry for the device shown in FIG. 1. The control circuitry includes a processor or controller 202 that directs or manages the high level operations of device 100. An interface circuit 204 facilitates communication between device 100 and a host device 250. A read/write channel 206 operates in conjunction with a preamplifier/driver circuit (preamp) 208 to write data to and to read data from a data storage medium such as medium 110 in FIG. 1. Preamp 208 also optionally acts as a power supply to electrical components included in a recording head such as a read transducer, a write transducer, heaters, etc. Preamp 208 is illustratively electrically connected to recording head 120 through a HGA circuit that is connected to preamp 208 and to one or more recording head 120 electrical connection points. A servo circuit 210 provides closed loop positional control for voice coil motor 140 that positions recording head 120.

Figure 3A:
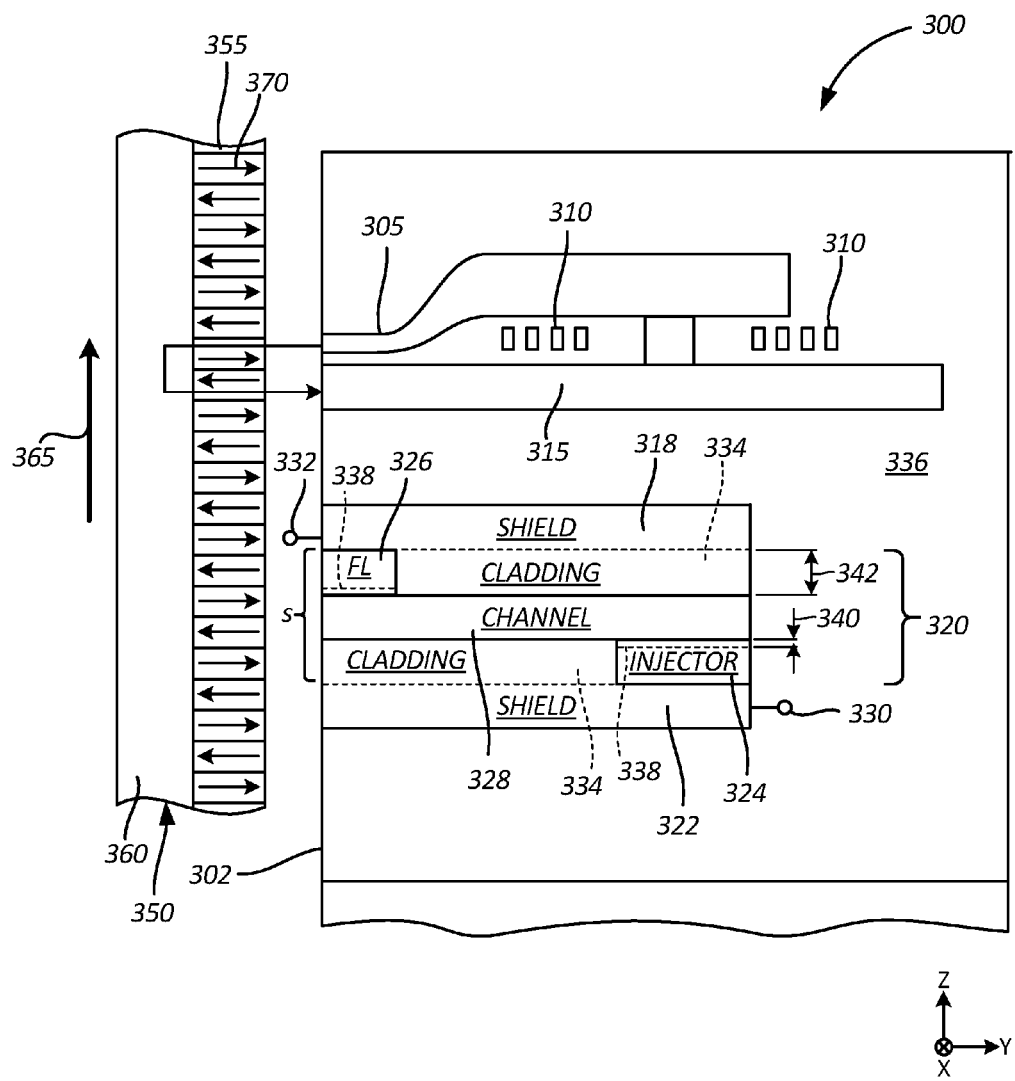
FIG. 3A is a schematic diagram of a cross-section of one embodiment of a recording head that reads from and writes to a storage medium.

FIG. 3A is a schematic diagram showing a cross-sectional view of portions of a recording head 300 and a data storage medium 350 taken along a plane substantially normal to a plane of a bearing surface (for example, an air bearing surface (ABS)) 302 of recording head 300. The recording head elements shown in FIG. 3A are illustratively included in a recording head such as recording head 120 in FIGS. 1 and 2. Medium 350 is illustratively a data storage medium such as medium 110 in FIG. 1. Those skilled in the art will recognize that recording heads and recording media commonly include other components. Embodiments of the present disclosure are not limited to any particular recording heads or media. Embodiments of the present disclosure may be practiced in different types of recording heads and media.

Recording head 300 includes a write pole 305, a magnetization coil 310, a return pole 315, a top shield 318, a read transducer 320, a bottom shield 322 and a wafer overcoat 336. Storage medium 350 includes a recording layer 355 and an underlayer 360. Storage medium 350 rotates in the direction shown by arrow 365. Arrow 365 is illustratively a direction of rotation such as arrow 117 in FIG. 1.

In an embodiment, electric current is passed through coil 310 to generate a magnetic field. The magnetic field passes from write pole 305, through recording layer 355, into underlayer 360, and across to return pole 315. The magnetic field illustratively records a magnetization pattern 370 in recording layer 355. Read transducer 320 senses or detects magnetization patterns in recording layer 355, and is used in retrieving information previously recorded to layer 355.

In the embodiment shown in FIG. 3A, read transducer 320 is a LSV reader. LSV reader 320 includes a spin injector 324, a detector 326 and a channel layer 328 that extends from spin injector 324 to detector 326.

The spin injector 324 may include an electrically conductive, magnetic layer (not separately shown in FIG. 3A) that has a magnetization that is pinned in a direction (preferably perpendicular to the bearing surface). Pinning of the magnetization of the pinned magnetic layer may be achieved by, for example, exchange coupling with a layer of anti-ferromagnetic material (not separately shown in FIG. 3A).

The detector 326 may include a magnetic, electrically conductive layer having a magnetization that is free to move in response to a magnetic field, and can therefore be referred to herein as a free layer (FL). Injector 324 and/or detector 326 may be separated from channel layer 328 by a thin electrically insulating barrier layer 338. A thickness of barrier layer 328 is denoted by reference numeral 340.

The portion of LSV reader 320 proximate to the bearing surface 302 does not include relatively thick synthetic antiferromagnetic (SAF) and antiferromagnetic (AFM) stacks that are typically present in, for example, current perpendicular-to-plane (CPP) Tunnel Junction Magnetoresistive (TMR) readers. Therefore, a spacing between top shield 318 and bottom shield 322 of LSV reader 320, which is denoted by s, is substantially less than a shield-to shield spacing in, for example, a CPP TMR reader. It should be noted that, in the interest of simplification, shield-to-shield spacing s in the Z-axis direction in FIG. 3A is shown as being uniform along a length (in the Y-axis direction) of LSV reader 320. However, in different embodiments, to accommodate a multi-layered injector 324, a shield-to-shied spacing away from the bearing surface 302 may be substantially greater than the shield-shield spacing s proximate to the bearing surface 302.

For allowing a detection current to flow to detector 326, spin injector 324 is connected to a current source (not shown) via terminal 330. Detector 326 is connected to a suitable voltage measuring device (not shown) via terminal 332.

First, the detection current from the current source is made to flow through the spin injector 324 and through the channel layer 328. This flow of current causes electron spins to accumulate in channel layer 328, which then transports the spins to the detector 326.

When the spins are transported to the detector 326, an electric potential difference, which varies depending upon an external magnetic field, appears between the detector 326 and the channel layer 328. The voltage measuring device detects electric potential difference appearing between the detector 326 and the channel layer 328. In this manner, the LSV reader 320 can be applied as an external magnetic field sensor for detecting bits stored on a magnetic data storage medium such as 350.

Figure 3B:
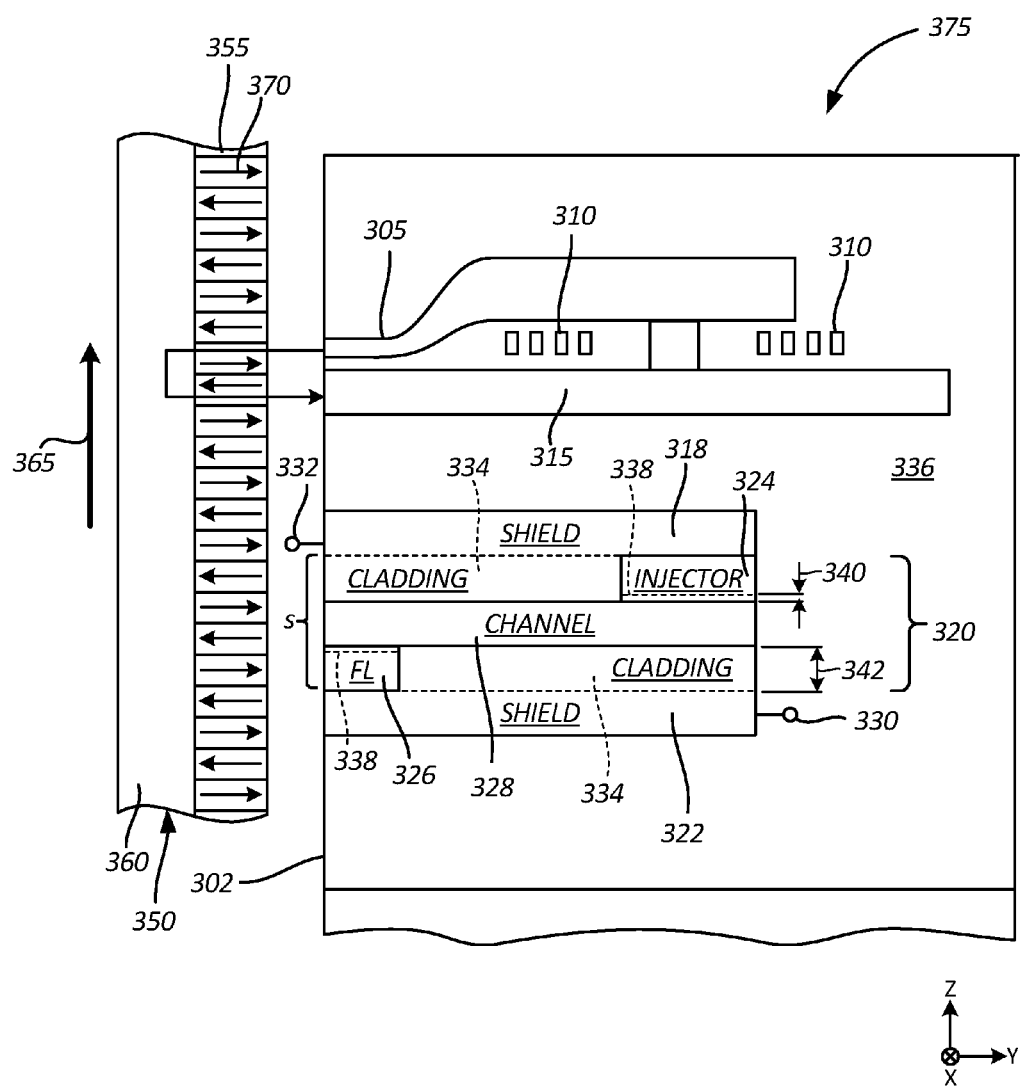
FIGS. 3B, 3C and 3D are schematic diagrams of cross-sections of other embodiments of a recording head that reads from and writes to a storage medium.
Figure 3C:
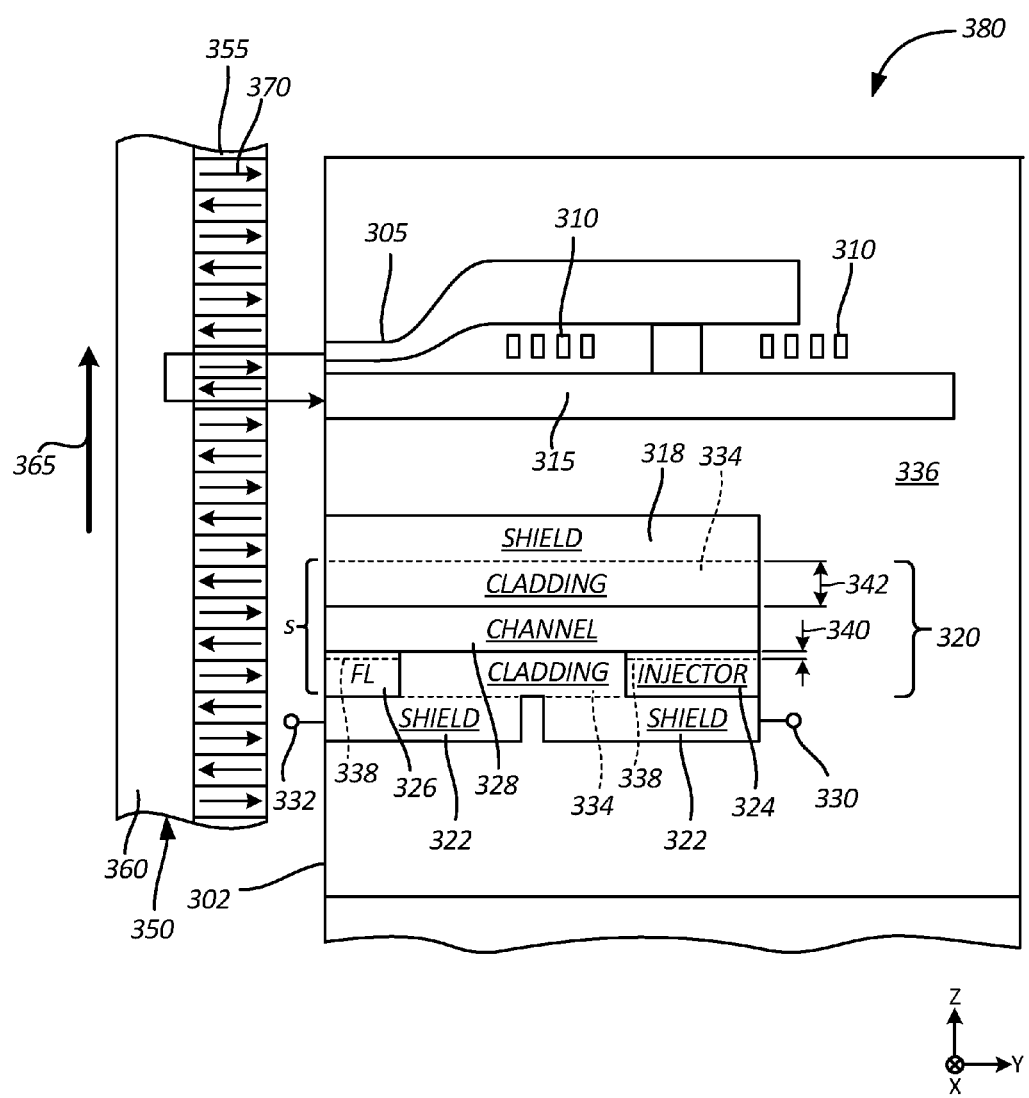
Figure 3D:
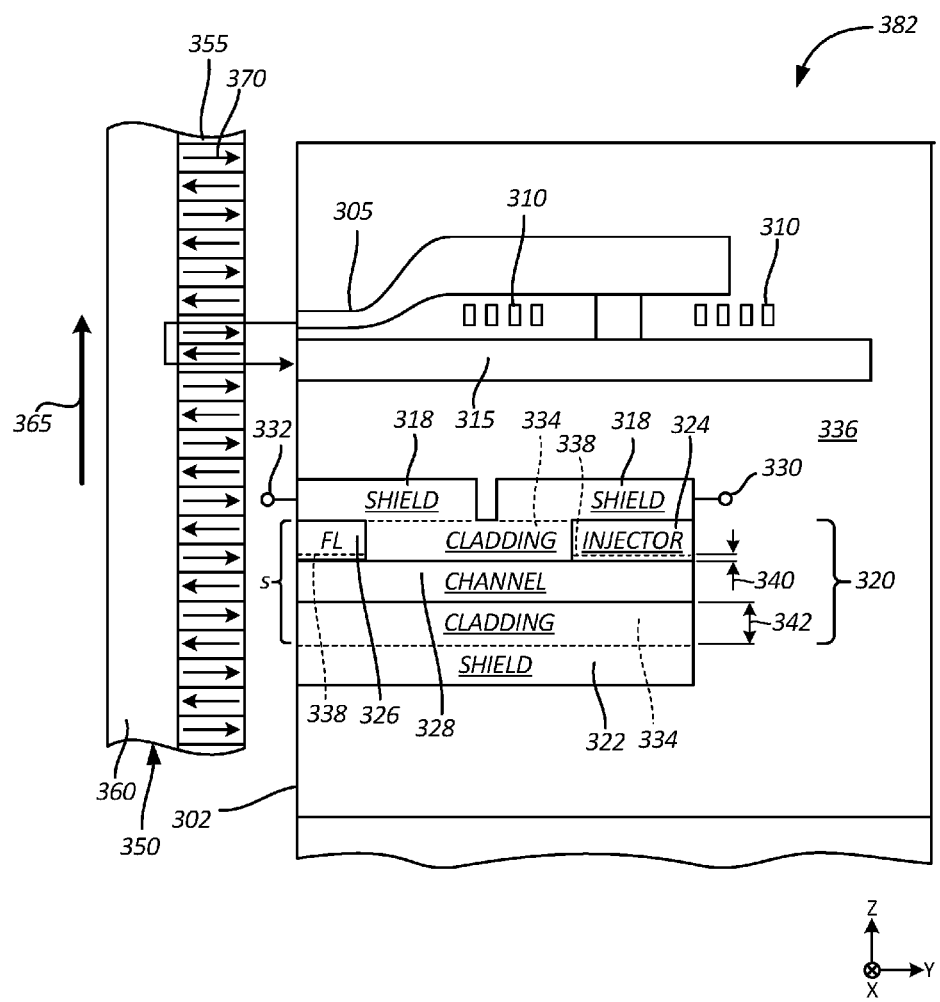

In some embodiments, to suppress spin-scattering at surfaces of the channel layer, an exterior cladding (such as 334) may be disposed around the channel layer 328. A thickness of cladding layer 334 is denoted by reference numeral 342. FIG. 3B shows an embodiment of a recording head 375 in which injector 324 is above channel 328 and detector 326 is below channel 328. In other respects, recording head 375 is substantially similar to recording head 300. FIGS. 3C and 3D show other embodiments of recording heads denoted by reference numerals 380 and 382, respectively. Other than injector 324 and detector 326 being on a same side of channel layer 328 in recording heads 380 and 382 and bottom shield 322 or top shield 318 being separated into two electrically-isolated portions, recording heads 380 and 382 are substantially similar to recording head 300.

As noted above, to decrease a total reader resistance and increase an amplitude of the bit detection signal, different embodiments such as 300, 375, 380 and 382 employ a spin valve reader design that simultaneously increases spin-polarized current and decreases a junction resistance at an injector-channel interface. One such embodiment is described below in connection with FIGS. 4A and 4B.

Figure 4A:
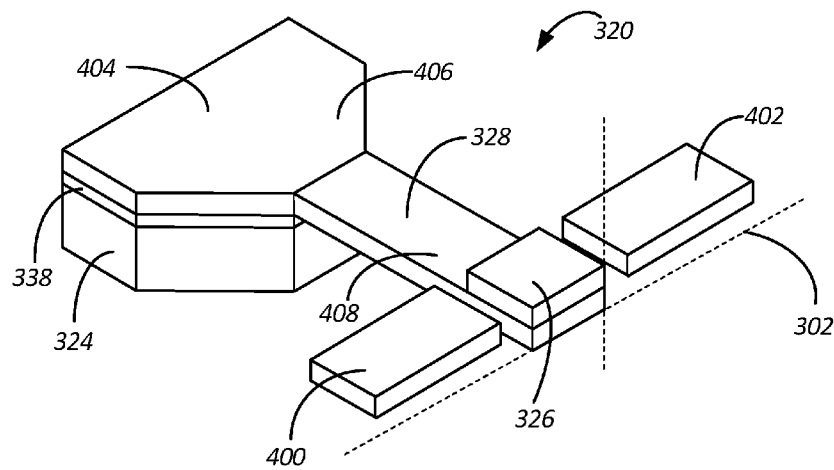
FIG. 4A is a schematic perspective view of a lateral spin valve reader in accordance with one embodiment.
Figure 4B:
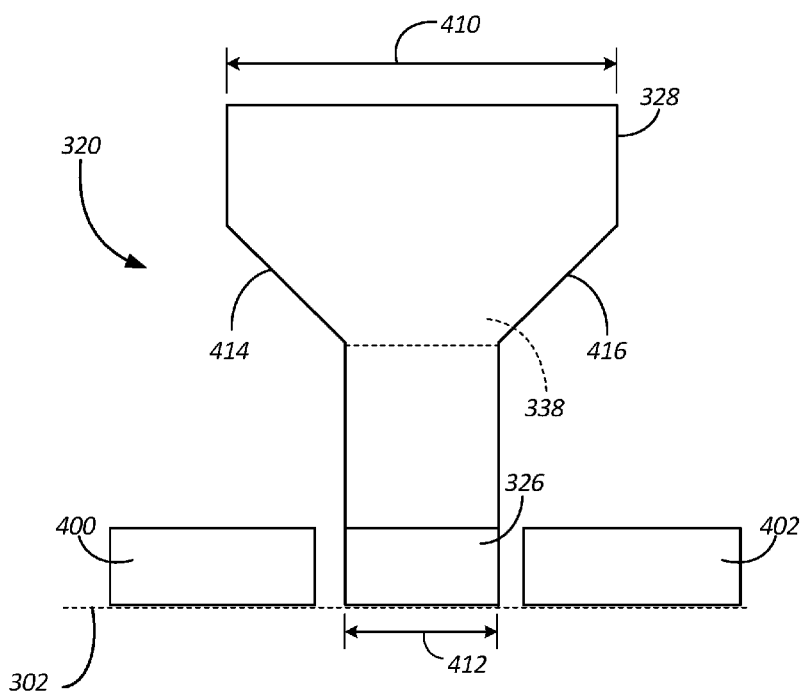
FIG. 4B is a top view of the lateral spin valve reader of FIG. 4A.

FIG. 4A is a schematic perspective view of LSV reader 320 of FIG. 3A. FIG. 4B is a top-down view of the LSV reader 320 of FIG. 4A. As noted earlier, LSV reader 320 includes injector 324, detector 326 and channel layer 328 that extends from injector 324 to detector 326. In the interest of simplification, top and bottom shields, etc., are not shown in FIGS. 4A and 4B. Tunnel barrier 338 is included between injector 324 and channel layer 328. To mitigate against resistance that arises due to the inclusion of tunnel barrier 338, the spin injector may be made larger. Thus, as can be seen in FIG. 4A, spin injector 324 is a relatively large area spin injector. The relatively large area spin injector 324 is employed to leverage a benefit of the tunnel junction in the injector 324 for suppression of spin-absorption at the injector-channel interface and thereby enhance spin-selectivity and spin-polarized current injected into the LSV channel while simultaneously avoiding elevated resistance from the tunnel junction. Side shields 400 and 402 are included for magnetostatic biasing of the FL of detector 326. The top-down view of LSV reader 320 in included in FIG. 4B to show the size of the large-area injector 324 compared to the detector 326.

As can be seen in FIGS. 4A and 4B, channel layer 328 includes a paddle region 404, a flare region 406, and a tip region 408. Paddle region 404 illustratively has a width 410, and tip region 408 illustratively has a width 412. Flare region 406 has a first side 414 and a second side 416 that is not parallel to side 414. Sides 414 and 416 start being spaced apart by width 410 and come closer together until they are spaced apart by width 412 (smaller than 410) as the sides meet tip region 408. Or, in other words, flare region 406 includes two sides 414 and 416 that are tapered going from paddle region 404 to tip region 408. In some embodiments, width 410 may range from tens of nanometers to the micron scale. Also, in such embodiments, width 412 may be tens of nanometers or less. It should be noted that dimensions of widths 410 and 412 and not limited to the examples provided herein and any suitable width dimensions may be used in different embodiments. In the embodiment shown in FIGS. 4A and 4B, a geometry of injector 324 and tunnel barrier 338 corresponds to a geometry of the paddle region 404 and flare region 406 of channel layer 328. However, elements 324, 328 and 338 may be of any suitable shape and the shapes of these elements are not limited to the shapes shown in FIGS. 4A and 4B.

Figure 5:
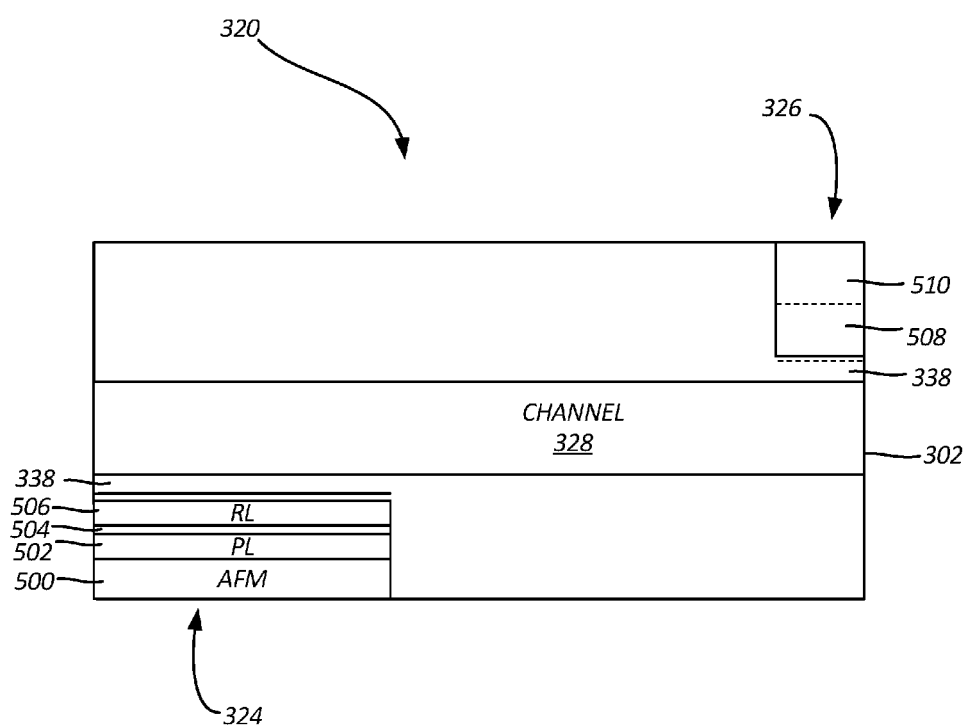
FIG. 5 is a schematic diagram of a cross-section of a lateral spin valve reader in accordance with one embodiment.

FIG. 5 is a schematic diagram of a cross-section of lateral spin valve reader 320 in accordance with one embodiment. As can be seen in the embodiment of FIG. 5, injector 324 of sensor 320 includes an anti-ferromagnetic (AFM) layer 500 and a synthetic anti-ferromagnetic (SAF) structure that includes a pinned layer 502, a thin separation layer 504, which may comprise a metal such as Ruthenium (Ru) in some embodiments, and a reference layer 506. In the embodiment shown in FIG. 5, tunnel barrier 338 is included between injector 324 and channel 328. In some embodiments, detector 326 may comprise multiple layers. In one embodiment, detector 326 may comprise a CoFeB (cobalt, iron and boron) layer 508 and an additional stack 510. In some embodiments, the CoFeB layer 508 and the stack 510 may be integrated into a single layer. In some embodiments, no tunnel barrier is employed between detector 326 and channel 328. In other embodiments, a tunnel barrier 338 is included between detector 326 and channel 328. Injector 324 and detector 326 are connected by non-magnetic channel 328 but otherwise electrically insulated so no parallel conduction paths are present. In other words, the bottom shield (322 in FIG. 3A) does not take part in electrical conduction as in the case of a CPP-style read head. Other aspects of embodiments of LSV reader 320 that are of note are as follows:

1) The SAF/AFM injector 324 or detector 326 may include a conventional magnetic alloy or Heusler alloy for further enhancement of coherent spin injection.

2) Channel 328 may include a non-magnetic metal such as Cu, Mg, Ag, etc.

3) Channel 328 may alternatively be formed of a two-dimensional semiconductor such as graphene or transition-metal dichalcogenide ($MoS_2$, $WS_2$, etc.)

4) Dependent on the type of application, both injector 324 and/or detector 326 may or may not contain a tunnel barrier. The example shown in FIG. 5 is for MgO tunnel barriers. In should be noted that embodiments of LSV reader 320 are not limited to the layers and materials or combinations of materials described above. In different applications, any suitable layers and/or layer materials may be utilized.

Figure 6A:
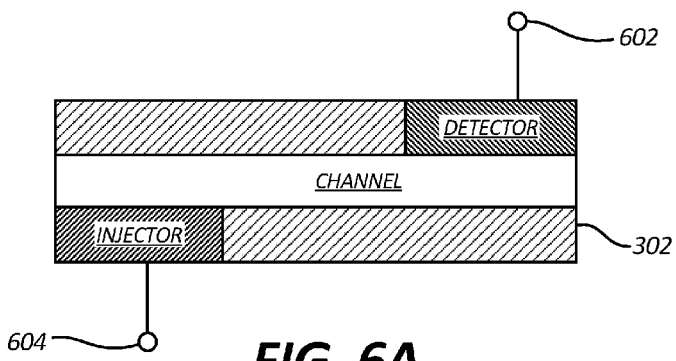
FIGS. 6A, 6B and 6C are schematic diagrams of cross-sections of lateral spin valve readers with different lead terminal configurations.
Figure 6B:
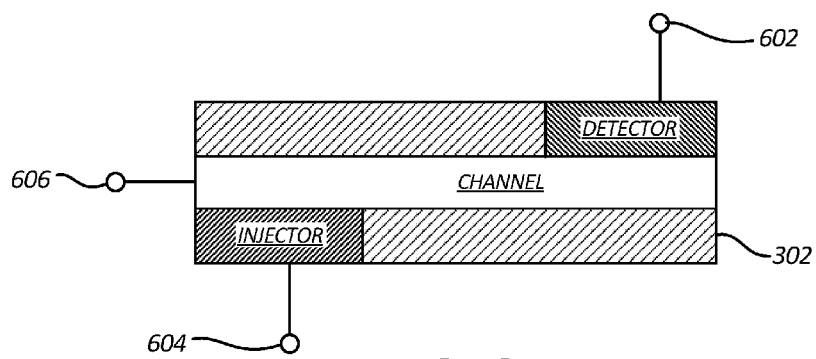
Figure 6C:
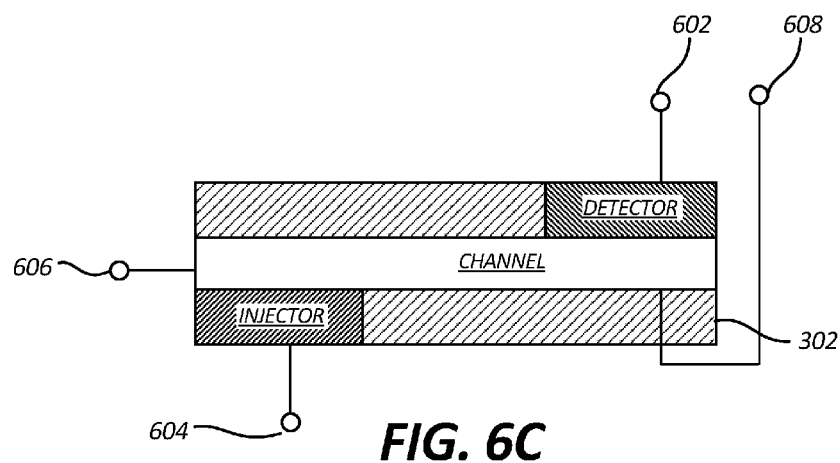

In different embodiments, the LSV reader is electrically isolated from any surrounding conductor that may short injector and detector leads. Such surrounding conductors may include magnetic shields and/or secondary spin injectors. It is further noted that two, three, four, or any other number of contacts may be implemented in various embodiments of the LSV reader. The contact configuration utilized depends on a type of detection scheme and application. FIG. 6A shows an example of an LSV reader such as 320 that has a two-terminal/two-contact (602 and 604) configuration. FIG. 6B shows an example of an LSV reader 320 that has a three-terminal/three-contact (602, 604 and 606) configuration, and FIG. 6C shows an example a four-terminal/four-contact (602, 604, 606 and 608) configuration. In some embodiments, it may be more practical from an implementation standpoint that the reader is either 2-terminal as illustrated in FIG. 6A or 3-terminal as illustrated in FIG. 6B.

Figure 7:
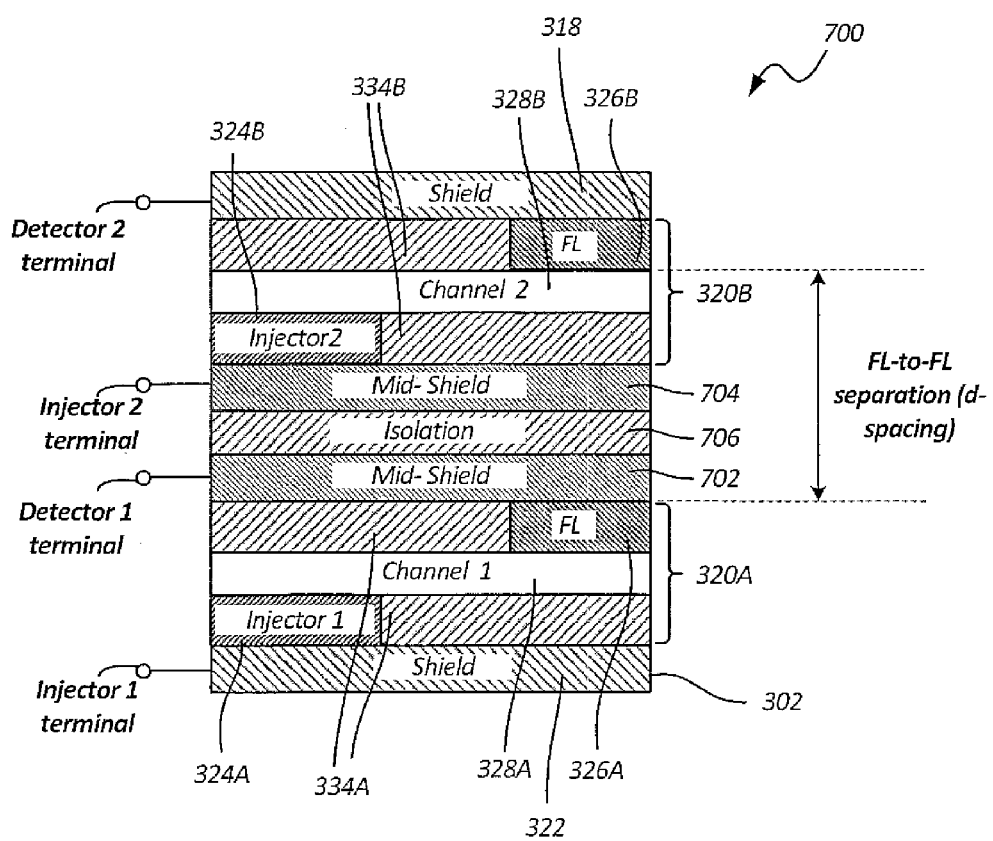
FIG. 7 is a diagrammatic illustration of a cross-section of a multi-sensor reader in accordance with one embodiment.

As indicated earlier in connection with the description of FIGS. 3A and 3B, an LSV reader such as 320 has a substantially narrow shield-to-shield spacing proximate to a bearing surface such as 302. The shield-to-shield spacing in the reader such as 320 is determined substantially by the channel and free layers (FL). Therefore, it is a suitable reader design to implement in a multi-sensor configuration where two or more readers are stacked on top of each other within a single recording head such as 300. An example of a dual-reader configuration is shown in FIG. 7. The embodiment of reader 700 in FIG. 7 includes a top shield 318 a bottom shield 322 and LSV readers 320A and 320B interposed between top shield 318 and bottom shield 322. Reader 320A includes a large area injector 324A, a detector 326A, a channel 328A and a cladding 334A. Similarly, reader 320B includes a large area injector 324B, a detector 326B, a channel 328B and a cladding 334B. In the embodiment shown in FIG. 7, a two-terminal connection configuration is used for each shield. Accordingly, bottom shield 322 and a middle shield 702 are utilized for electrical connection to reader 320A. Similarly, a middle shield 704 and top shield 318 are utilized for electrical connection to reader 320B. A suitable isolation layer 706 is interposed between middle shields 702 and 704 to provide the necessary electrical isolation between the shields. It should be noted that FIG. 7 is an illustrative embodiment of a multi-sensor reader and, in other embodiments, more than two sensors may be employed.

In the multi-sensor configuration, a critical parameter is the FL-to-FL spacing, d (in FIG. 7), and is conventionally set by the additive thicknesses of the stack SAF, mid-shields, and isolation layers. Reducing d enables the multi-sensor reader to be implemented in a higher linear density drive. Substantially drastic d-spacing reduction may be achieved by implementing LSV-based magnetic readers because, as noted above, they eliminate the thicknesses of SAF and AFM stacks at the bearing surface that are typically present in, for example, CPP TMR readers.

Although various uses of the LSV reader with the large-area tunnel-junction injector are disclosed in the application, embodiments are not limited to the particular applications or uses disclosed in the application. It is to be understood that even though numerous characteristics and advantages of various embodiments of the disclosure have been set forth in the foregoing description, together with details of the structure and function of various embodiments of the disclosure, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the LSV reader with the large-area tunnel-junction injector while maintaining substantially the same functionality without departing from the scope and spirit of the present disclosure. In addition, although the preferred embodiment described herein is directed to particular type of LSV reader with the large-area tunnel-junction injector utilized in a particular data storage system, it will be appreciated by those skilled in the art that the teachings of the present disclosure can be applied to other data storage devices without departing from the scope and spirit of the present disclosure.

What is claimed is:

1. A lateral spin valve reader comprising:
a channel layer having a first end at a bearing surface and a second end that is away from the bearing surface;
a detector structure disposed over an upper surface of a first portion of the channel layer that is proximate to the first end of the channel layer; and
a spin injection structure disposed below a lower surface of a second portion of the channel layer that is proximate to the second end of the channel layer,
wherein an area of overlap between the spin injection structure and the second portion of the channel layer is substantially larger than an area of overlap between the detector structure and the first portion of the channel layer, and
wherein a width of the spin injection structure in a direction parallel to the bearing surface is substantially larger than a width of the detector structure in the directional parallel to the bearing surface, and
wherein the second portion of the channel layer comprises a region that is substantially wider than the first portion of the channel layer in the direction parallel to the bearing surface.

2. The lateral spin valve reader of claim 1 and wherein the width of the spin injection structure in the direction parallel to the bearing surface is tens of nanometers.

3. The lateral spin valve reader of claim 1 and wherein a length of the spin injection structure in a direction perpendicular to the bearing surface is greater that a length of the detector structure in the direction perpendicular to the bearing surface.

4. The lateral spin valve reader of claim 1 and further comprising a tunnel barrier between the spin injection structure and the channel layer.

5. The lateral spin valve reader of claim 3 and wherein no tunnel barrier is included between the detector structure and the channel layer.

6. The lateral spin valve reader of claim 1 and further comprising a tunnel barrier between the detector structure and the channel layer.

7. The lateral spin valve reader of claim 1 and wherein the channel layer comprises a non-magnetic metal.

8. The lateral spin valve reader of claim 1 and wherein the channel layer comprises a semiconductor.

9. The lateral spin valve reader of claim 1 and wherein the spin injection structure comprises a Heusler alloy.

10. The lateral spin valve reader of claim 1 and further comprising a two-terminal configuration.

11. A multi-sensor reader within a single recording head, the multi-sensor reader comprising:
a top shield;
a bottom shield; and
a plurality of lateral spin valve readers interposed between the top shield and the bottom shield, wherein each of the plurality of lateral spin valve readers comprises:
a channel layer having a first end that is proximate to a bearing surface and a second end that is away from the bearing surface;
a detector structure disposed over an upper surface of a first portion of the channel layer that is proximate to the first end of the channel layer; and
a spin injection structure disposed below a lower surface of a second portion of the channel layer that is proximate to the second end of the channel layer,
wherein an area of overlap between the spin injection structure and the second portion of the channel layer is substantially larger than an area of overlap between the detector structure and the first portion of the channel layer;
first and second mid shields between a first one of the plurality of lateral spin valve readers and a second one of the plurality of lateral spin valve readers; and
an isolation layer between the first mid shield and the second mid shield.

12. The multi-sensor reader of claim 11 and wherein, in each of the plurality of lateral spin valve readers, the spin injection structure is substantially larger than the detector structure.

13. The multi-sensor reader of claim 11 and wherein, in each of the plurality of lateral spin valve readers, the second portion of the channel layer comprises a region that is substantially wider than the first portion of the channel layer.

14. The multi-sensor reader of claim 11 and wherein each of the plurality of lateral spin valve readers further comprises a tunnel barrier between the spin injection structure and the channel layer.

15. The multi-sensor reader of claim 14 and wherein, in each of the plurality of lateral spin valve readers, no tunnel barrier is included between the detector structure and the channel layer.

16. The multi-sensor reader of claim 11 and wherein each of the plurality of lateral spin valves readers further comprises a tunnel barrier between the detector structure and the channel layer.

17. The multi-sensor reader of claim 11 and wherein, in each of the plurality of lateral spin valve readers, the channel layer comprises a non-magnetic metal or a semiconductor.

18. The multi-sensor reader of claim 11 and wherein each of the plurality of lateral spin valve readers further comprises a two-terminal configuration, a three-terminal configuration or a four-terminal configuration.

19. A multi-sensor reader within a single recording head, the multi-sensor reader comprising:

a plurality of lateral spin valve readers interposed between a top shield and a bottom shield, wherein each of the plurality of lateral spin valve readers comprises:

a detector structure located proximate to a bearing surface;

a spin injection structure located away from the bearing surface; and a channel layer extending from the detector structure to the spin injection structure, wherein an area of overlap between the channel layer and the spin injection structure is substantially larger than an area of overlap between the channel layer and the detector structure, wherein a first one of the plurality of lateral spin valve readers has a two terminal configuration with only a single detector terminal connected to the top shield and only a single injector terminal connected to a mid shield between the first one of the plurality of lateral spin valve readers and a second one of the plurality of lateral spin valve readers, and no terminal connected to the channel layer.

20. The multi-sensor reader of claim 19 and wherein, in each of the plurality of lateral spin valve readers, the spin injection structure is substantially larger than the detector structure.

* * * * *